US012407483B2

(12) United States Patent
Worrall et al.

(10) Patent No.: US 12,407,483 B2
(45) Date of Patent: Sep. 2, 2025

(54) DATA PACKET TRANSMISSION MANAGEMENT

(71) Applicant: Vodafone Group Services Limited, Newbury (GB)

(72) Inventors: Chandrika Worrall, London (GB); Alexey Kulakov, London (GB)

(73) Assignee: Vodafone Group Services Limited, Newbury (GB)

( * ) Notice: Subject to any disclaimer, the term of this patent is extended or adjusted under 35 U.S.C. 154(b) by 98 days.

(21) Appl. No.: 18/362,823

(22) Filed: Jul. 31, 2023

(65) Prior Publication Data

US 2024/0048337 A1 Feb. 8, 2024

(30) Foreign Application Priority Data

Aug. 4, 2022 (EP) .................................... 22188833

(51) Int. Cl.
*H04L 5/00* (2006.01)
*H04W 72/1268* (2023.01)
*H04W 72/543* (2023.01)

(52) U.S. Cl.
CPC .......... *H04L 5/0078* (2013.01); *H04L 5/0048* (2013.01); *H04W 72/1268* (2013.01); *H04W 72/543* (2023.01)

(58) Field of Classification Search
CPC ..... H04L 5/0078; H04L 5/0048; H04L 1/188; H04L 1/1887; H04L 5/0053; H04W 72/1268; H04W 72/543; H04W 28/0263; H04W 24/02
See application file for complete search history.

(56) References Cited

U.S. PATENT DOCUMENTS

| | | | |
|---|---|---|---|
| 2010/0272001 A1* | 10/2010 | Lee ...................... | H04W 72/30 370/312 |
| 2019/0159136 A1* | 5/2019 | MolavianJazi ..... | H04W 52/362 |
| 2019/0166528 A1* | 5/2019 | Zhang ................ | H04W 36/026 |
| 2019/0268919 A1* | 8/2019 | Shi ...................... | H04W 72/566 |
| 2019/0320362 A1* | 10/2019 | Liu .................... | H04W 28/0263 |
| 2020/0100156 A1 | 3/2020 | Liu | |
| 2020/0351025 A1* | 11/2020 | Choi .................... | H04L 1/0693 |
| 2021/0258234 A1* | 8/2021 | Vincent ................ | H04L 43/067 |
| 2022/0007386 A1* | 1/2022 | Wu ........................ | H04L 67/06 |
| 2022/0104062 A1 | 3/2022 | Aijaz | |
| 2022/0225287 A1* | 7/2022 | Zhang .................. | H04W 72/56 |

OTHER PUBLICATIONS

EP Search Report for application No. 22188833.2 dated Dec. 22, 2022.

(Continued)

*Primary Examiner* — Kashif Siddiqui
(74) *Attorney, Agent, or Firm* — Workman Nydegger

(57) ABSTRACT

Method and system for communicating data with user equipment (UE) comprising establishing a data radio bearer, DRB, between a base station and the UE and transmitting data packets between the base station and the UE through the DRB, wherein data packets are transmitted by multiplexing data packets for different data packet types at different periodicities in a time division multiplexed data stream.

20 Claims, 12 Drawing Sheets

(56) References Cited

OTHER PUBLICATIONS

Kyocera: "Open issues on group scheduling for NR MBS", 3GPP Draft; R2-2108002, 3RD Generation Partnership Project (3GPP), Mobile Competence Centre ; 650, Route Des Lucioles ; F-06921 Sophia-Antipolis Cedex ; France, vol. RAN WG2, No. Online; Aug. 9, 2021-Aug. 27, 2021 Aug. 6, 2021.

"3rd Generation Partnership Project; Technical Specification Group Services and System Aspects; Study on XR (Extended Reality) and media services (Release 18)", 3GPP Standard; Technical Report; 3GPP TR 23.700-60, 3RD Generation Partnership Project (3GPP), Mobile Competence Centre ; 650, Route Des Lucioles ; F-06921 Sophia-Antipolis Cedex ; France, No. V0.3.0 May 31, 2022 (May 31, 2022.

* cited by examiner

```
-- ASN1START
-- TAG-DRX-CONFIG-START

DRX-Config ::=      SEQUENCE {
    drx-onDurationTimer     CHOICE {
        subMilliSeconds     INTEGER (1..31),
        milliSeconds        ENUMERATED {
            ms1, ms2, ms3, ms4, ms5, ms6, ms8, ms10, ms20, ms30, ms40, ms50, ms60,
            ms80, ms100, ms200, ms300, ms400, ms500, ms600, ms800, ms1000, ms1200,
```

| Release 17 | 563 | 3GPP TS 38.331 V17.0.0 (2022-03) |
|---|---|---|

```
    drx-InactivityTimer     ENUMERATED {
                                ms0, ms1, ms2, ms3, ms4, ms5, ms6, ms8, ms10, ms20, ms30, ms40, ms50, ms60, ms80,
                                ms100, ms200, ms300, ms500, ms750, ms1280, ms1920, ms2560, spare9, spare8,
                                spare7, spare6, spare5, spare4, spare3, spare2, spare1 },
    drx-HARQ-RTT-TimerDL    INTEGER (0..56),
    drx-HARQ-RTT-TimerUL    INTEGER (0..56),
    drx-RetransmissionTimerDL   ENUMERATED {
                                s10, s11, s12, s14, s16, s18, s116, s124, s133, s140, s164, s180, s196, s1112, s1128,
                                s1160, s1320, spare15, spare14, spare13, spare12, spare11, spare10, spare9,
                                spare8, spare7, spare6, spare5, spare4, spare3, spare2, spare1 },
    drx-RetransmissionTimerUL   ENUMERATED {
                                s10, s11, s12, s14, s16, s18, s116, s124, s133, s140, s164, s180, s196, s1112, s1128,
                                s1160, s1320, spare15, spare14, spare13, spare12, spare11, spare10, spare9,
                                spare8, spare7, spare6, spare5, spare4, spare3, spare2, spare1 },
    drx-LongCycleStartOffset    CHOICE {
        ms10                    INTEGER (0..9),
        ms20                    INTEGER (0..19),
        ms32                    INTEGER (0..31),
```

Fig. 11

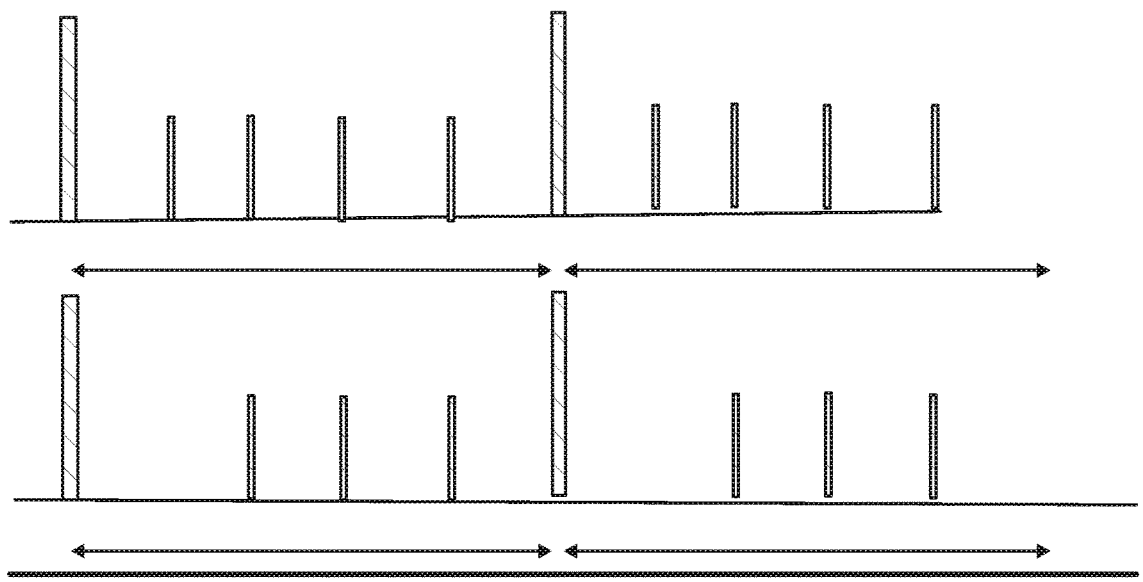
Fig. 13
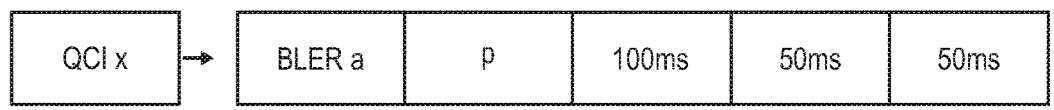
Fig. 14

DATA PACKET TRANSMISSION MANAGEMENT

CROSS-REFERENCE TO RELATED APPLICATIONS

This application claims priority from EP Patent Application No: 22188833.2, filed Aug. 4, 2022, which is expressly incorporated by reference herein in its entirety.

FIELD OF THE INVENTION

The present invention relates to a system and method for transmitting data within a telecommunications system with improved network efficiency.

BACKGROUND OF THE INVENTION

Separate services within mobile networks can be provided as separate data streams. Furthermore, each individual service may each comprise separate data streams. These separate data streams often have different quality of service requirements as they have different attributes when received by user equipment (UE) or terminal. Different types of data packets within each data stream can have different requirements. These service requirements may be based on particular desired user experiences for each service, portion of a service or other technical requirements. For example, live video chat services may require low latency but may accept high error rates. In contrast, video content delivery services, such as those providing movies and TV programmes, can be buffered but require higher bandwidth and lower error rates to reach particular user experience requirements or other technical requirements. Data services such as those providing extended reality (XR) functionality to video goggles or glasses can include separate data streams with different traffic patterns and their own separate requirements. These may include video presented to a user in front of their field of view or omnidirectional background images. Furthermore, some frames of the video stream may be coded in a different way to others (e.g., I vs P frames).

FIG. 1 illustrates schematically a system that includes one or more service providers 60 that provide data services through a user plane function (UPF) 30 to one or more base stations (gNB) 20 and onto individual UEs 10. Each service 60 may have a defined set of quality of service (QoS) requirements. For each data stream having a particular QoS set of requirements, a separate data radio bearer (DRB) 40 may be set up between the base station 20 and the UE 10. Again, each DRB 40 has a particular set of transmission quality parameters that it can reach, and this is set when the DRB 40 is initiated between a particular base station 20 and UE 10. All data through the DRB 40 is provided according to this initial property set. It is possible to send different data streams through the same DRB 40 (e.g., using multiplexing) and the DRB 40 sends each data packet in the data stream according to the same parameters used to initialise the DRB 40.

As shown in FIG. 1, the system 5 includes one or more UEs 10, at least one base station or gNB 20. The set of data services 60 stream data to the UPF 30 as separate data streams 1-7. Each of these data streams 1-7 has its own quality requirements or parameters. Quality requirements from different data streams 1-7 may be similar or the same and when they are the same or similar then, these may be combined to pass through the same QoS flow 50. For example, FIG. 1 shows example data service 1 using a single QoS flow (1) from the UPF 30 to the base station 20. However, data services 2 and 3 have the same or similar quality requirements (different from data service 1) and so can share the same QoS flow (2).

The base station 20 sets up different DRBs 40 to pass the data to the UE 10. Again, a separate DRB 40 may be initiated for each data service, data type or data streams having the same or similar quality requirements. These data streams may be sent through the same DRB 40.

Under 5G NB, up to 32 DRBs are available for each UE 10 at any one time. Therefore, this is a limited resource. Furthermore, setting up new DRBs 40 at each base station 20 and UE 10 incurs additional overheads. Whilst it is possible to multiplex different streams through a single DRB 40 if necessary, the DRB 40 must be set up with the highest set of parameter requirements out of all of the different data services that are to use that particular DRB 40. As the DRB 40 must be initiated with the highest data stream requirements, other data streams within the same DRB 40 (that may have lower quality requirements) are still provided with this highest level. This unnecessarily allocates resources when they are not required for particular data flows. This can be particularly apparent when data services provide multiple different data streams for virtual reality or augmented reality (e.g., extended reality—XR). Within such extended reality services, there may be multiple data streams including video streams, cloud gaming, background architecture and other data streams necessary to set up the full service. This can require a high number of separate DRBs 40 to be set up (each with different data quality parameters) or separate data streams may be multiplexed within the same DRB 40 at the same (highest) data quality transmission rates and parameters.

Whilst these particular system requirements are applied to the Uplink (UL) side (e.g., between the gNB and UE), similar issues are encountered on the Downlink (DL) side.

Therefore, there is required a system and method to overcome these problems.

SUMMARY OF THE INVENTION

According to a first aspect, there is provided an improved system and method in which data is communicated with a terminal such as user equipment (UE). One or more data radio bearers are established between the UE and a base station (also known as a gNB). Usually, the properties and attributes (or sets of attributes) of data packets sent through a particular gNB are fixed in terms of their transmission quality and this is set at the time that the DRB is instantiated or established, with all data packets treated in the same way. However, the system can be improved in terms of efficiency of system resources being used more optimally, when different data packets or data packet types are sent through the DRB at different quality conditions or parameters (e.g., 5QI value, priority level, packet error rate, maximum data burst volume, averaging window, bit rate, resource type, and packet delay budget, etc.). When variable or different priority level data packets are sent through the same DRB then different transmission quality parameters such as retransmission timers and periodicities may be used. In an example implementation, one or more fields within data headers of the data packets may be used to convey information, such as low or high priority, which describes each data packet or data packet type. The gNB may apply different retransmission timers (e.g., DRX-RetransmissionTimerUL_Low and DRX-RetransmissionTimerUL_high) or other parameters and inform the UE accordingly using different mechanisms.

The data packets may provide one or more data services. The data service may be any one or more of: video, instant messaging, augmented reality, video call, and entertainment digital content, for example. The different data packets (being transmitted according to different quality conditions or parameters) may be different data packet types or parts of the same data service. Therefore, there may be one, two, three or more data packet types within each data service.

This improvement relates to both the Uplink (UL) for data packets generated at the UE and to the Downlink (DL) for data packets generated outside of the UE (e.g., at a server or service provider).

In accordance with a further aspect, there is provided a method for communicating data with user equipment, UE, the method comprising the steps of:
  establishing a data radio bearer, DRB, between a base station and the UE; and
  transmitting data packets between the base station and the UE through the DRB, wherein data packets are transmitted using different transmission quality parameters. Therefore, resources may be used more efficiently without requiring additional DRBs to be set up with separate transmission quality parameters and lower priority data packets do not need to be sent at higher transmission quality than required.

Preferably, the transmission quality parameters for each data packet may be determined by the base station. They may also be determined by other nodes within a telecommunications system.

Optionally, the transmission quality parameters for each data packet may be determined from information within a MAC header. This utilises an existing information transmission mechanism but with a new purpose. The data packets may then be transmitted through the DRB at the required transmission quality.

Optionally, the information may be included within a R field within the MAC header. This is particularly advantageous where there are only two different data packet types, as the R field is small (i.e., one bit).

Optionally, the information may be included within a LCID and/or eLCID field within the MAC header. This location is larger and may be used to provide greater granularity, or for a larger number of data packet types so that a greater granularity of control is achieved. The information may be added to the header by particular nodes within the telecommunications system or by the service provider, for example. The UE may also add such information when the data packets are generated at the UE.

Optionally, the transmission quality parameters may comprise any one or more of: 5QI value, priority level, packet error rate, maximum data burst volume, averaging window, bit rate, resource type, and packet delay budget. Other transmission quality parameters may be used.

Optionally, the method may further comprise the step of configuring the UE with a set of parameters based on the different transmission quality parameters.

Preferably, the set of parameters may comprise the number of hybrid automatic repeat request (HARQ) repetitions and/or DRX-RetransmissionTimerUL.

Optionally, the data packets may be transmitted using different transmission quality parameters and data packets of separate data flows and/or data packet types.

Optionally, different data packet types may be transmitted using different transmission quality parameters where data packets of the same type have the same transmission quality parameters.

Preferably, the different data packet types may comprise I and P frames. These are video data streams.

Optionally, the data packets transmitted between the base station and the UE are uplink data packets. They may also be downlink data packets.

Preferably, the uplink data packets may be transmitted on a physical uplink shared channel, PUSCH.

In accordance with a further aspect, there is provide User Equipment, UE, comprising means adapted to execute the steps of: establishing a data radio bearer, DRB, between a base station and the UE; and
  transmitting data packets between the base station and the UE through the DRB, wherein data packets are transmitted using different transmission quality parameters.

In accordance with a second aspect, there is provided a system and method for communicating data with user equipment, UE. A data radio bearer, DRB, is established or instantiated between a base station and the UE. Data packets are multiplexed (e.g., using time division multiplexing) over the DRB. In conventional telecommunication systems, when such multiplexing occurs, the periodicities of the separate data streams is the same for each DRB and this is set when the DRB is established. However, in this improved system and method, different periodicities are used in the data stream for different data packets, data services, separate data packet types within the same data service and/or separate data packet types. This improvement relates to both the Uplink (UL) and the Downlink (DL), as previously described.

In accordance with a further aspect, there is provided a method for communicating data with user equipment, UE, the method comprising the steps of:
  establishing a data radio bearer, DRB, between a base station and the UE;
  transmitting data packets between the base station and the UE through the DRB, wherein data packets are transmitted by multiplexing data packets for different data packet types at different periodicities in a time division multiplexed data stream. Therefore, resources may be used more efficiently without requiring additional DRBs to be set up with separate transmission quality parameters and lower priority data packets do not need to be sent at higher transmission quality than required.

Optionally, the method may further comprise the step of the base station providing the UE with information mapping the periodicities of the different data packet types in the time division multiplexed data stream. This information may be provided in different ways.

Optionally, the information mapping the periodicities of the separate data services in the multiplexed data stream may be provided as a table and/or bitmap.

Optionally, the information mapping the periodicities of the different data packet types may be provided to the UE within radio resource control (RRC) protocol during configuration of the DRB. Therefore, the UE receives and retains knowledge regarding how to send and receive different data packets and data packet types.

Preferably, the information mapping the periodicities of the different data packet types may be provided to the UE within radio resource control (RRC) protocol during configuration of the DRB within configured grant configuration.

Optionally, the data packets between the base station and the UE may be uplink data packets. They may also be downlink data packets.

Preferably, the uplink data packets may be transmitted on a physical uplink shared channel (PUSCH).

Optionally, separate data services or data streams of the same data service may have different round trip timing, RTT requirements.

Optionally, the separate data services may have different periodicity requirements.

Optionally, the different data packet types include I and P frames.

In accordance with a further aspect there is provide a computer program product comprising instructions which, when the program is executed by a computer, causes the computer to carry out the method of any previous claim.

In accordance with a further aspect, there is provided a telecommunications system comprising:
one or more base stations; and
data processing apparatus comprising means for carrying out the steps of any above-described method.

Optionally, the telecommunications system may further comprise a plurality of UEs.

In accordance with a further aspect, there is provided User Equipment, UE, comprising and means adapted to execute the steps of: establishing a data radio bearer, DRB, between a base station and the UE;
transmitting data packets between the base station and the UE through the DRB, wherein data packets are transmitted by multiplexing data packets for different data packet types at different periodicities in a time division multiplexed data stream.

In accordance with a third aspect, there is provided a system and method for transmitting data. A server (e.g., a user plane function) provides data services to one or more UEs via one or more base stations. Data packets to be transmitted between the server and a base station are assigned (implicitly or explicitly) with a set of transmission quality parameters (e.g., as part of a header of the data packet or otherwise). Therefore, the transmission quality parameters for each data packet are defined using information included within the data packets. The information may be properties of the data packets, for example. The data packets are transmitted between the server and the base station, according to the assigned set of transmission quality parameters. The information regarding the required transmission quality parameters may be included in a GPRS Tunnelling Protocol (e.g., GTP-U) header, for example. As the information is included in the data packets, then this information can be used to set up an appropriate DRB between the UE and base station. Furthermore, data packets having different transmission quality parameters may be transmitted between the base station and the UE over the same DRB at these different transmission and performance qualities and as defined in the information that accompanies each data packet.

In accordance with a further aspect, there is provided a method for transmitting data, the method comprising the steps of:
assigning data packets to be transmitted between a server and a base station with a set of transmission quality parameters, wherein the transmission quality parameters for each data packet are defined using information included within the data packets; and
transmitting the data packets between the server and the base station, according to the assigned set of transmission quality parameters. The server may be part of the core network. The data packets may provide one or more data services to user equipment.

Optionally, the information included within the data packets is data added to a header of the data packet.

Optionally, the information included within the data packets is a packet type of the data packet. Therefore, particular types of data packets may be mapped to particular transmission quality parameters and a lookup table or other mechanism may be used to determine the transmission quality parameters or set of transmission quality parameters to 30 use with that particular data packet type. This also makes it more efficient to provide this information.

Preferably, the packet type may be included within a GTP-U header.

Optionally, the method may further comprise the step of establishing one or more Quality of Service (QoS) flows between the base station and the server according to requirements of the transmission quality parameters. The one or more QoS flows are used to transmit the data packets between the base station and the server. The QoS flow or flows may be set up according to the particular set of transmission quality parameters.

Optionally, the transmission quality parameters for each data packet may be determined by the base station.

Preferably, the base station may determine the transmission quality parameters for each data packet by receiving information from a control plane node.

Preferably, the control plane node may be an access and mobility management function (AMF).

Optionally, the transmission quality parameters may comprise any one or more of: 5QI value, priority level, packet error rate, maximum data burst volume, averaging window, bit rate, resource type, frame rate, periodicity, compression characteristic, and packet delay budget. Other transmission quality parameters or combinations may be used.

Optionally, the information included within the data packets may be or include attributes of the data packet, the method may further comprise the step of the base station determining the transmission quality parameters for each data packet based on the attributes of the data packet.

Preferably, the server may be a user plane function, UPF.

In accordance with a further aspect, there is provided a computer program product comprising instructions which, when the program is executed by a computer, causes the computer to carry out any of the above-described method.

In accordance with a further aspect, there is provided a telecommunications system comprising:
one or more base stations; and
data processing apparatus comprising means for carrying out the steps of any of the above-described method.

Preferably, telecommunications system may further comprise a plurality of UEs.

In accordance with a further aspect, there is provided a User Equipment, UE, comprising means adapted to execute the steps of:
assigning data packets to be transmitted between a server and a base station with a set of transmission quality parameters, wherein the transmission quality parameters for each data packet are defined using information included within the data packets, wherein the data packets are transmitted between the server and the base station, according to the assigned set of transmission quality parameters.

In accordance with a further aspect, there is provided a telecommunications system comprising one or more base stations; and data processing apparatus comprising means for carrying out the steps of the any of the above-described methods.

The telecommunications system may include one or more UEs (preferably many UEs of different types), one or more base stations (gNB), one or more service providers, and/or one or more user plane functions (UPF) and any one or more of these nodes or components may be configured to execute any or all of the described methods.

The methods described above may be implemented as a computer program comprising program instructions to operate a computer. The computer program may be stored on a computer-readable medium.

The computer system and telecommunications system may include a processor or processors (e.g. local, virtual or cloud-based) such as a Central Processing unit (CPU), and/or a single or a collection of Graphics Processing Units (GPUs). The processor may execute logic in the form of a software program. The computer system may include a memory including volatile and non-volatile storage medium. A computer-readable medium may be included to store the logic or program instructions. The different parts of the system may be connected using a network (e.g. wireless networks and wired networks). The computer system may include one or more interfaces. The computer system may contain a suitable operating system such as UNIX, Windows® or Linux, for example. Particular instructions or method steps may be carried out by different components, or the steps may be shared across separate components. Any of the aspects may be combined or different parts of the different described methods may be used with any other described method or parts of the described methods. Furthermore, a telecommunications system may use any one or more (or all) of the described methods. When used together, the separate methods combine to provide additional efficiency gains. For example, either or both of the uplink and the downlink may be enhanced using the described methods.

It should be noted that any feature described above may be used with any particular aspect or embodiment of the invention.

BRIEF DESCRIPTION OF THE FIGURES

The present invention may be put into practice in a number of ways and embodiments will now be described by way of example only and with reference to the accompanying drawings, in which:

FIG. 11 shows an example information element used to configure a telecommunications system;

FIG. 13, shows a schematic diagram of data packets being transmitted within an enhanced telecommunications system; and FIG. 14 shows an example set of parameters used to initiate a DRB within the enhanced telecommunications system.

It should be noted that the figures are illustrated for simplicity and are not necessarily drawn to scale. Like features are provided with the same reference numerals.

DETAILED DESCRIPTION OF THE PREFERRED EMBODIMENTS

Figure 1:
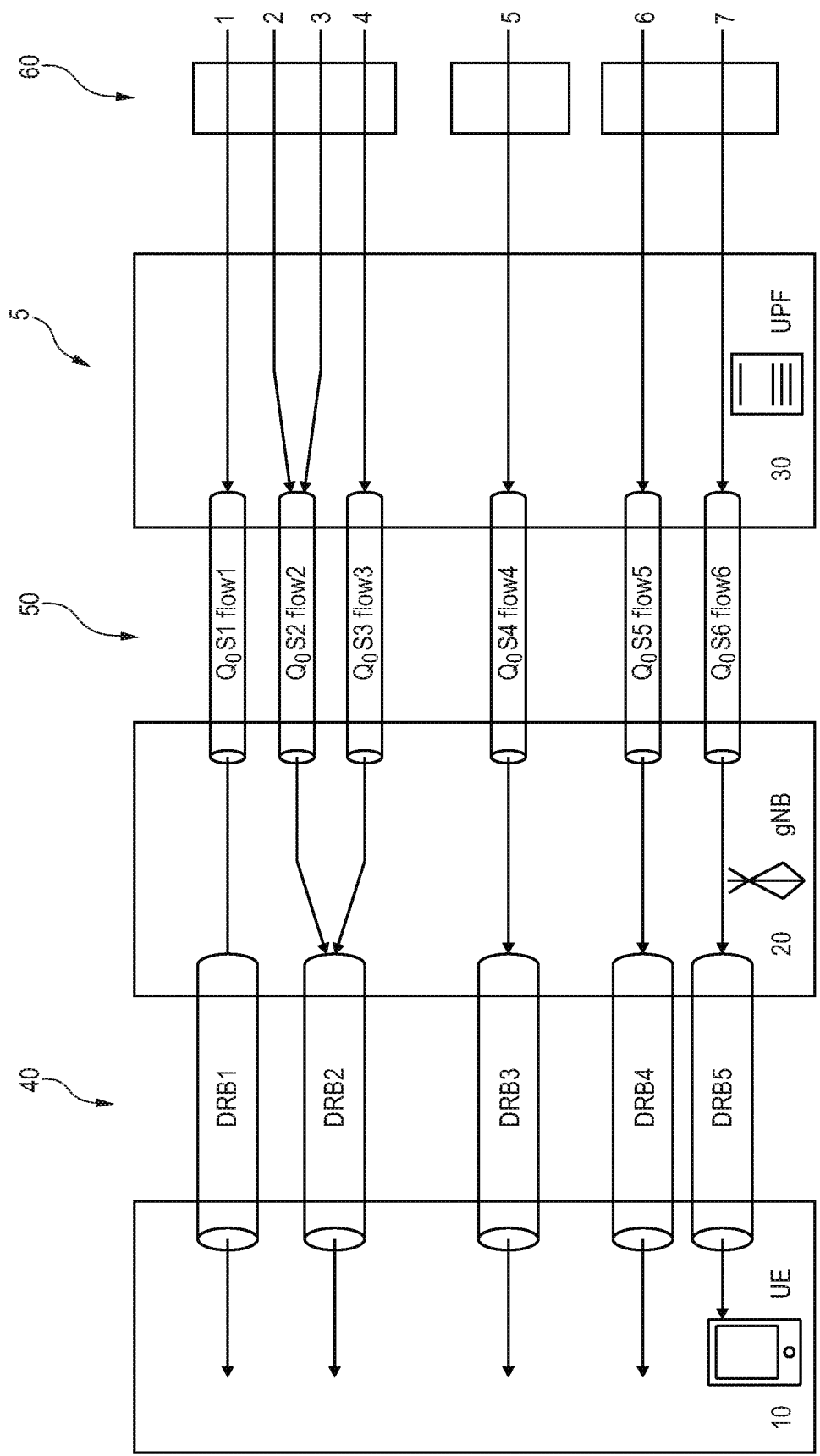
FIG. 1 shows a schematic diagram of an existing system, including User Equipment (UE), a base station and a User Plane Function (UPF)

Mobile network types (e.g., LTE) map different services (e.g., video, voice, web, etc) to particular quality characteristics, which must be satisfied in order to provide a necessary user experience. These services are provided to customers via user equipment (UE) such as smartphones, tablets, IoT devices or other connected devices. Once data packets are sent from the User Plane Function or Entity (UPF) 30 to a base station (or gNB), they are treated according to predefined Quality of Service (QoS) flows that are mapped to a data radio bearer (DRB) 40. The configuration (features and settings) of the DRBs 40 are selected to fulfil these QoS parameters.

Some data services can be technically realised such that all data packets providing that service are the same or similar in terms of size, periodicity, and other requirements. However, there are some services that have data packets of different size, periodicity, and importance to the customer or end user. One or more data flows may be transmitted as parts of different data services. Furthermore, different data streams within a single data service, can include data packets that are more important than others and so have different technical and quality of transmission requirements.

For example, streaming video into glasses or 3-D goggles may include images of primary importance (visual information provided at the user's central field of view and other images may provide background or peripheral information. These data may be transmitted as separate streams having different compression and other quality parameters. These may comprise I and P frames, for example, providing information for the central and less important peripheral information, respectively.

When a service is setup or initiated, corresponding configurations may be provided to subsequent nodes in the network so that the traffic may be handled according to these configurations and requirements.

In general, different QoS flows may be mapped to separate DRBs 40 to enable the gNB 20 to satisfy the QoS requirements of the air interface. The gNB 20 may enable radio related features and schedule the packets differently for each DRB 40.

Example characteristics of different QoSs (5GQIs) in 5G are standardized in 23.501 table 5.7.4-1. This is shown in table 1 below.

TABLE 1

| 5QI Value | Resource Type | Default Priority Level | Packet Delay Budget | Packet Error Rate | Default Maximum Data Burst Volume | Default Averaging Window | Example Services |
| --- | --- | --- | --- | --- | --- | --- | --- |

Important quality attributes may include: resource type: guaranteed bit rate or non-guaranteed bit rate, priority, packet delay budget, and packet error rates, for example. Other quality attributes may be used. Once the DRB 40 and/or QoS flow or flows 50 are established then these parameters remain known to the gNB 20 without the need for additional data to be sent. Some parameters may be sent to the gNB 20 explicitly. These may include: maximum bit rate, guaranteed bit rate, and allocation retention priority, for example.

In 5G (New Radio-NR) technology, traffic from QoS flows 50 with very similar of the same QoS characteristics may be associated to the same DRB 40 as long the QoS of these QoS flows 50 is satisfied. However, this can lead to higher than necessary resources being provided to data packets from different QoS flows and this can cause inefficiencies in the use of radio and other resources.

The treatment of data packets inside one DRB 40 remains the same for all data packets in that DRB 40. Whilst this can be acceptable where few different services are being provided to a UE 10, this can increase inefficiencies when additional data services are added or used at the same time.

Figure 2:
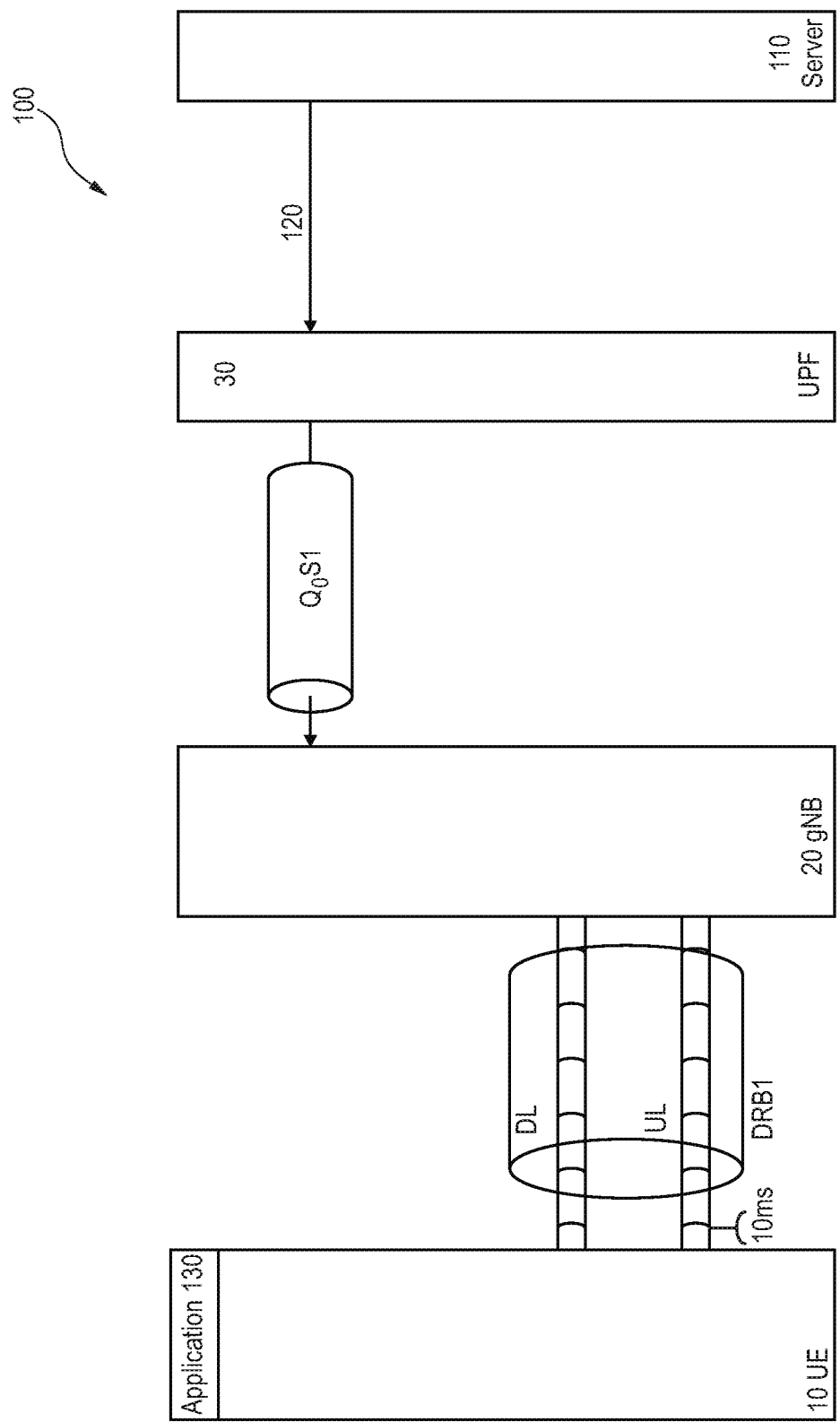
FIG. 2 shows a schematic diagram of an existing method for setting up a data radio bearer (DRB) in the system of FIG. 1.

FIG. 2 shows schematically a system 100 in which a conventional DRB 40 is set up for a single data service 120 (e.g., a video stream) provided by a server 110. As can be seen from FIG. 2, all data packets in the uplink (UL) and downlink (DL) on the radio interface within DRB1 are treated the same. In this example, the periodicity of the data streams within DRB1 is 10 ms (other values may be used). This is despite different data packets (or data packet types) having a different value from the perspective of service satisfaction. For example, it may be acceptable for some of the data packets (or frames) to be lost at a higher rate or transmitted with a higher jitter without contributing to unacceptable service degradation. Some data packets may be compressed using different or higher compression ratios or technology and still provide an acceptable user experience. Nevertheless, all data packets within DRB1 are treated the same and expend the same system and telecommunications resources (e.g., per bit of data).

In the example of FIG. 2, the data service 120 originates within server 110 (e.g., an extended reality server). The data packets are sent to the UPF 30. The data stream between the UPF 30 and the gNB 20 has a particular set of transmission quality parameters (e.g., each corresponding to the parameter types of table 1). These transmission quality parameters are used to set up a QoS flow (QoS1 in FIG. 2) within which to provide the data packets between the UPF 30 and the gNB 20.

An application 130 on the UE 10 receives and processes the data packets so that the service can be rendered on the UE 10 or provide an additional service.

Figure 3:
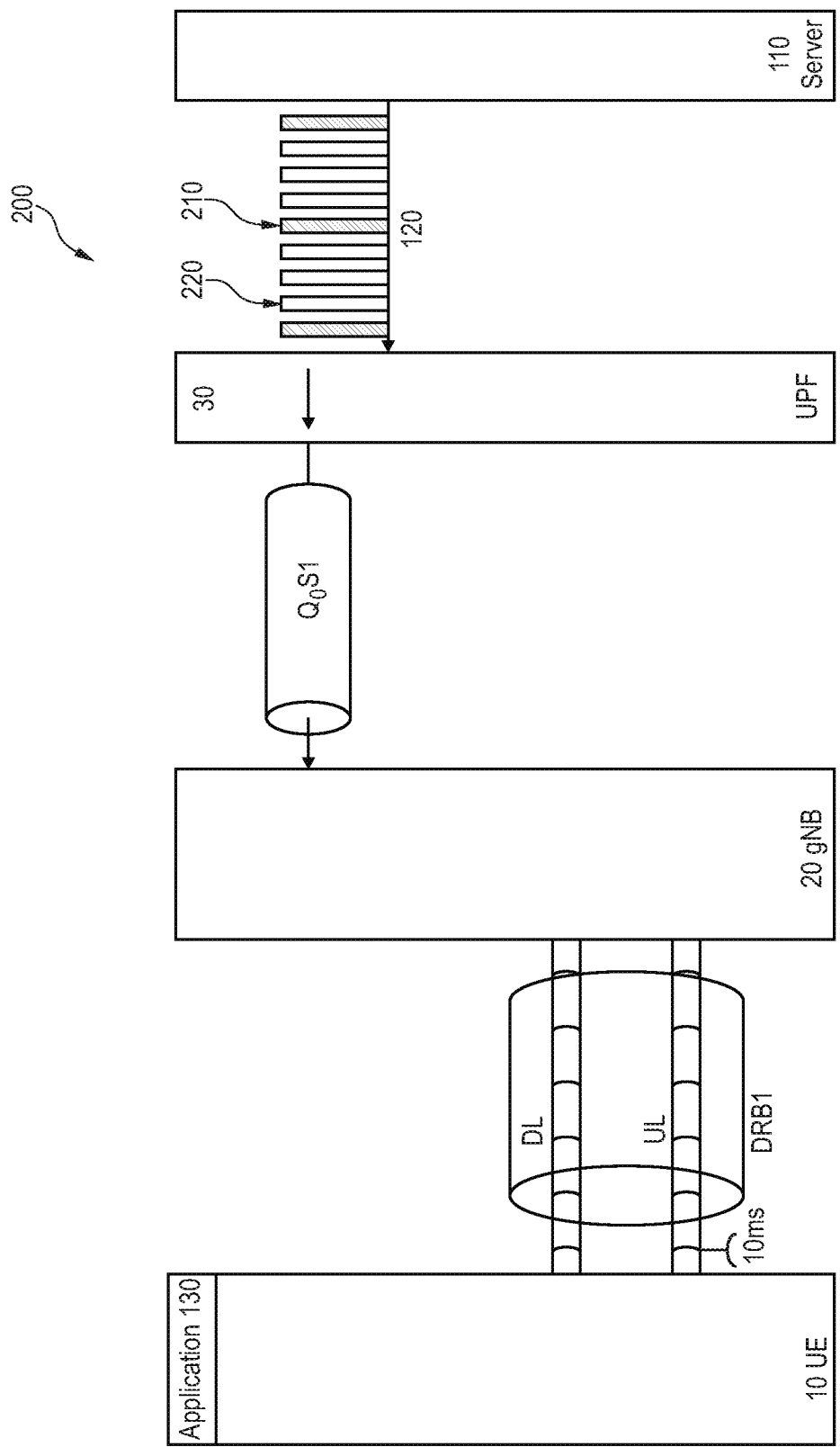
FIG. 3 shows a schematic diagram of a further existing method for setting up a DRB in the system of FIG. 1.

Whilst FIGS. 2 illustrates the provision of a data service that has a single type of data packets, some data services can include different types of data packets or frames. FIG. 3 shows schematically a system 200 that expands upon the system 100 of FIG. 2, where a data service 120 includes two different data packet types. For example, an XR data service may include a video stream to provide the XR environment.

Other types of data packets may have more demanding requirements such as a live video stream within the XR environment. For example, P-frame data packets and I-frame data packets, used to compress video for both the XR environment and for the live video stream are shown as being sent through the same QoS flow, QoS1 and DRB (DRB1) in FIG. 2.

Figure 4:
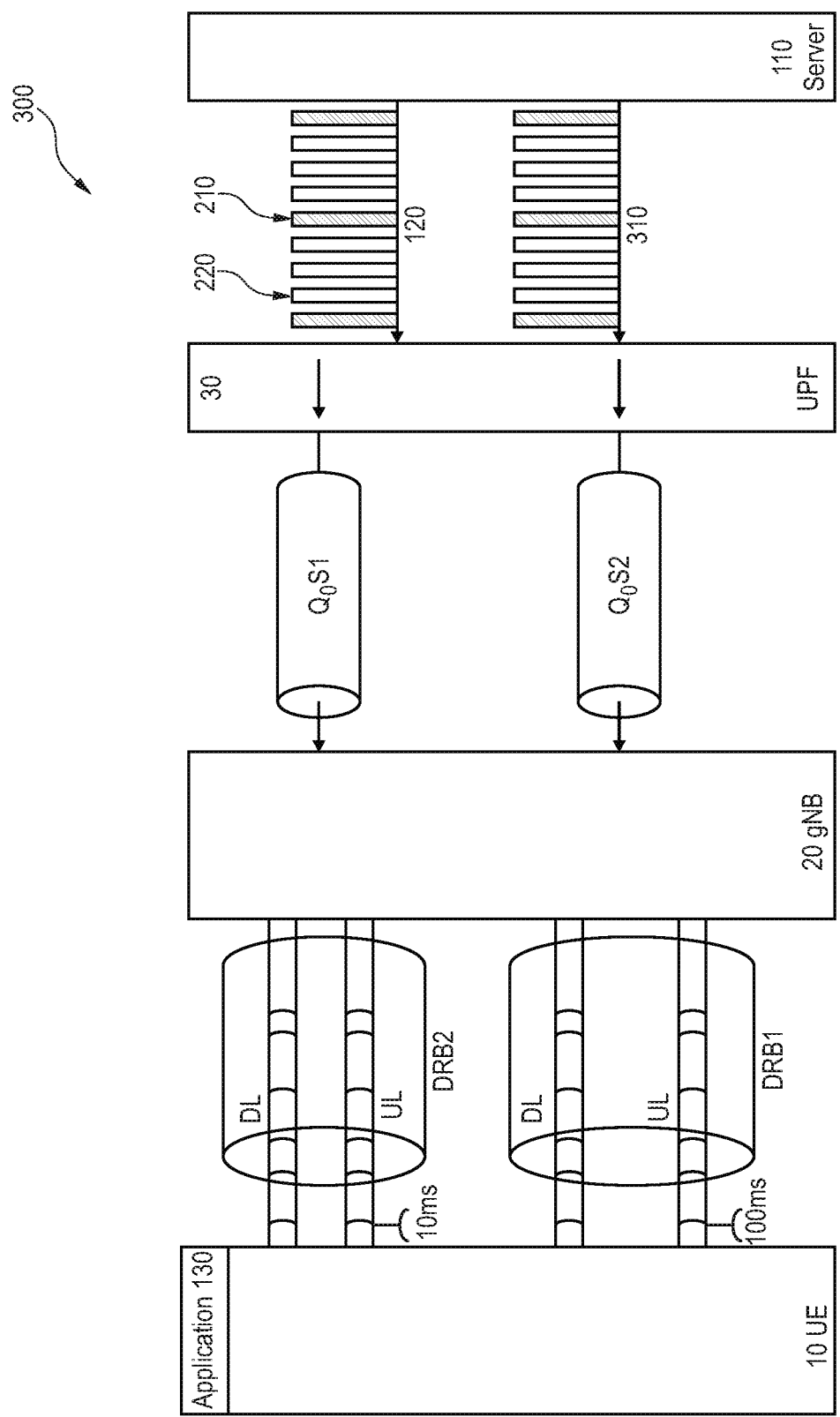
FIG. 4 shows a schematic diagram of a further existing method for setting up a DRB in the system of FIG. 1.

In order to avoid such a situation where different priority data streams have to be sent with the same transmission quality parameters, then multiple QoS streams and DRBs 40 may be set up. This is illustrated schematically in FIG. 4. In this alternative system 300, the XR environments stream 120 (having its compressed video data packets) is provided by the server 110 separately to the live video stream 310. However in this case, the live video stream has its own separate QoS flow (QoS2) with different transmission quality parameters to those of QoS1, which may have lower transmission quality parameter requirements. Separate DRBs (DRB1 and DRB2) are also set up between the gNB 20 and the UE 10 to provide these separate data streams. As can be seen from FIG. 4, one DRB has a periodicity of 10 ms (DRB2), whilst DRB1 has a periodicity of 100 ms. This is to accommodate the different data streams, which have different requirements. Whilst this avoids sending data packets at higher transmission quality parameters than necessary, this requires the setting up of an additional DRB, which has its own system overhead and is itself a limited resource.

Figure 5:
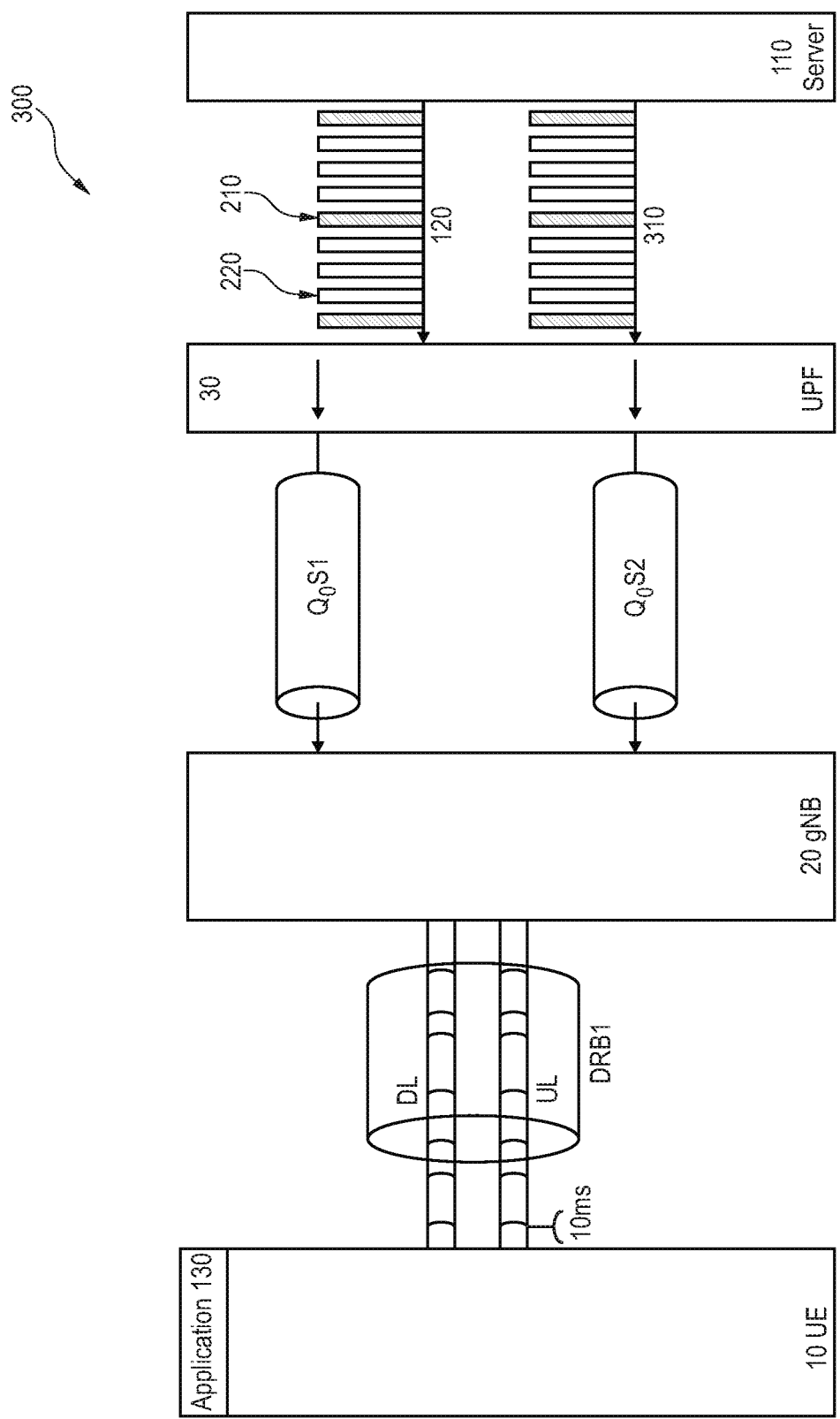
FIG. 5 shows a schematic diagram of an enhanced method for setting up a DRB in a telecommunications system.

Whilst the number of DRBs that any one UE 10 can support in New Radio (5G) has increased from eight DRBs to 32 DRBs, this still represents a limited resource. FIG. 5 illustrates the system mapping the two different QoS flows (QoS1 and QoS2) to the same DRB (DRB1) set up with the highest speed periodicity (10 ms) of the two DRBs of FIG. 4 but again, this configuration sends some data packets using a higher set of transmission quality parameters than necessary for that particular data stream.

There are several separate but complementary ways in which this situation can be improved. Each individual method that will be described can be used on its own and improve overall efficiency and effectiveness of the telecommunications system or they may be combined in any combination for even greater effect and improvement.

Figure 6:
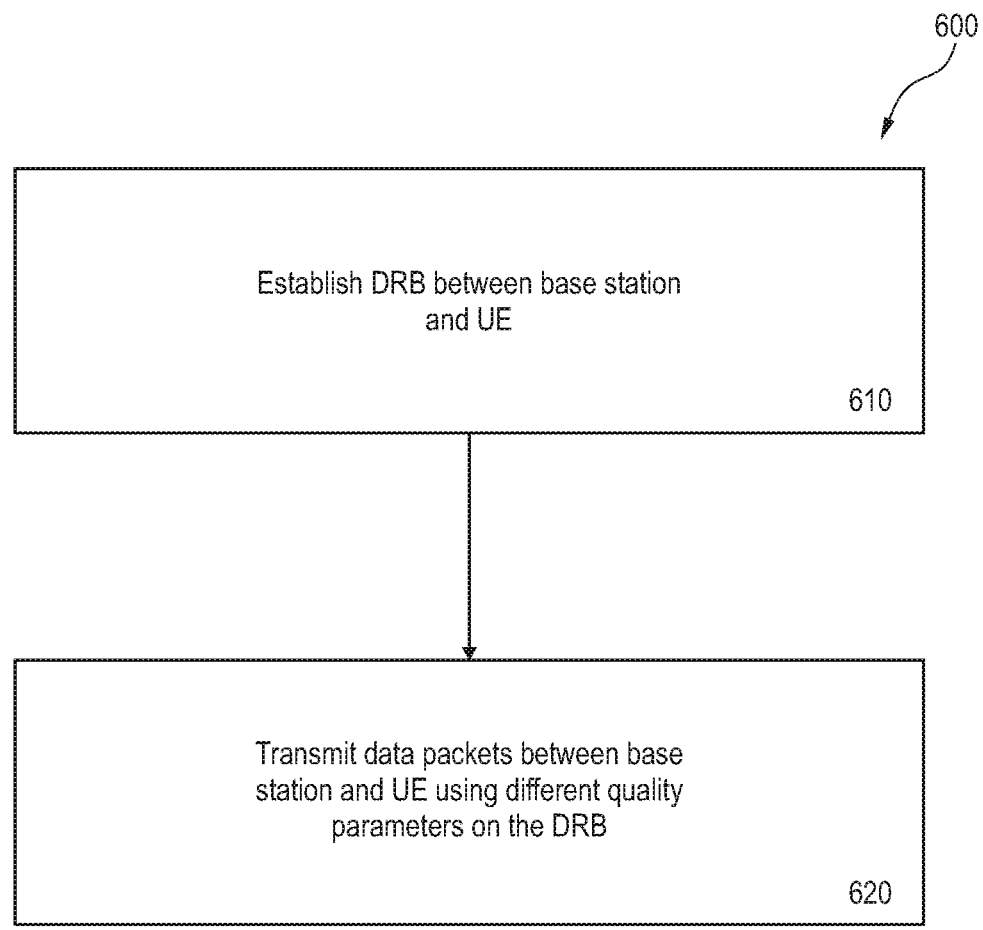
FIG. 6 shows a flowchart of a method for improving the transmission of data.

FIG. 6 shows a flow chart of a method 600 for communicating data to a UE 10. The data are transmitted in the form or data packets and may originate from a server 110, service or other network function. At step 610, a DRB 40 is established between a base station or gNB 20 and a UE 10. At step 620, the data packets are transmitted between the base station 20 and the UE 10 over the DRB 40 using different transmission quality parameters. Therefore, data traffic can be more efficiently communicated with the UE 10. For example, a video stream may include different parts or frames having different characteristics and requirements related to reliability, packet delay budget and acceptable jitter. These can be sent over the same DRB 40 and so reducing the total number of necessary DRBs but without having to set up the DRB 40 with the highest transmission quality parameter for any particular data packet type. This reduces the overall required overheads of the system and so more data can be transmitted more efficiently. Therefore, the DRB 40 can operate with variable transmission properties rather than being fixed.

Figure 7:
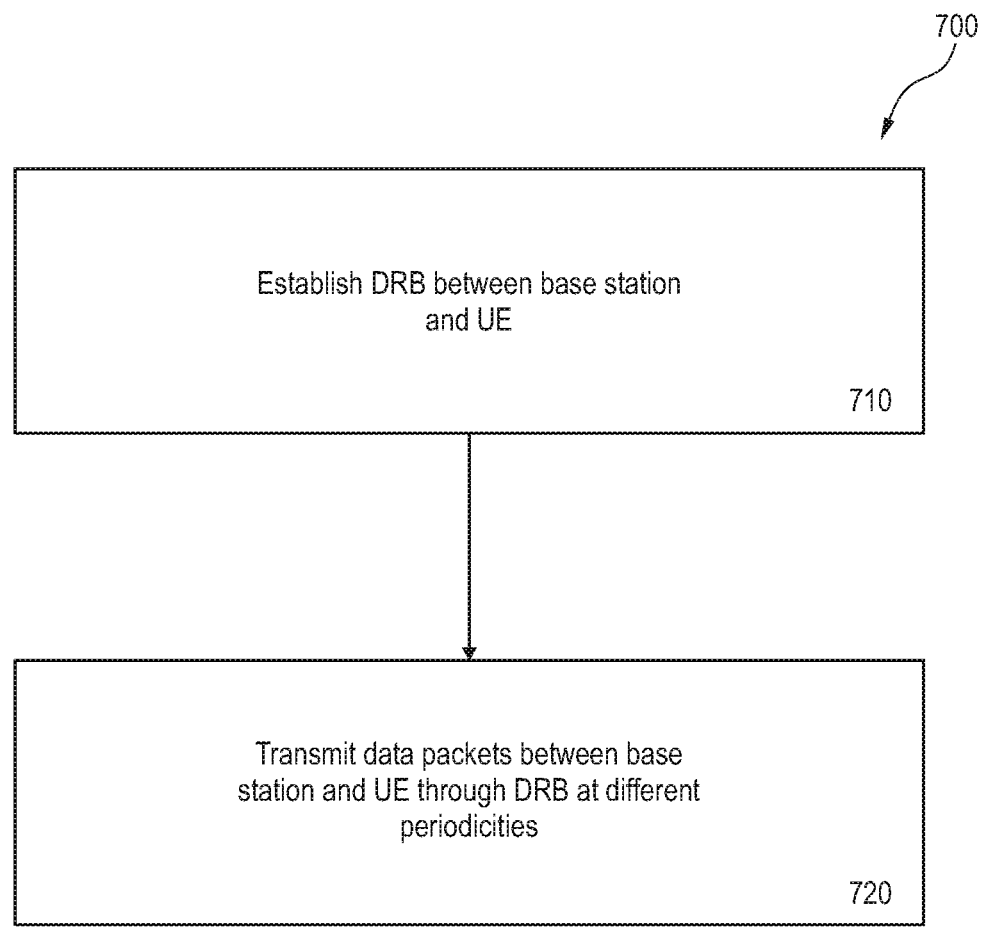
FIG. 7 shows a flowchart of a further method for improving the transmission of data.

FIG. 7 shows a flowchart of a further method 700 for improving the communication of data to the UE 10. Again, a DRB 40 is established between the base station or gNB 20 and the UE 10 at step 710. The data packets are transmitted over the DRB 40 at different or variable periodicities. For example, the base station 20 may provide the UE 10 with information mapping the periodicities of the different data packets or data packet types in a time division multiplexed data stream. The information mapping the periodicities of the separate data services in the multiplexed data stream may be provided as a table to the UE 10 or in another format.

Figure 8:
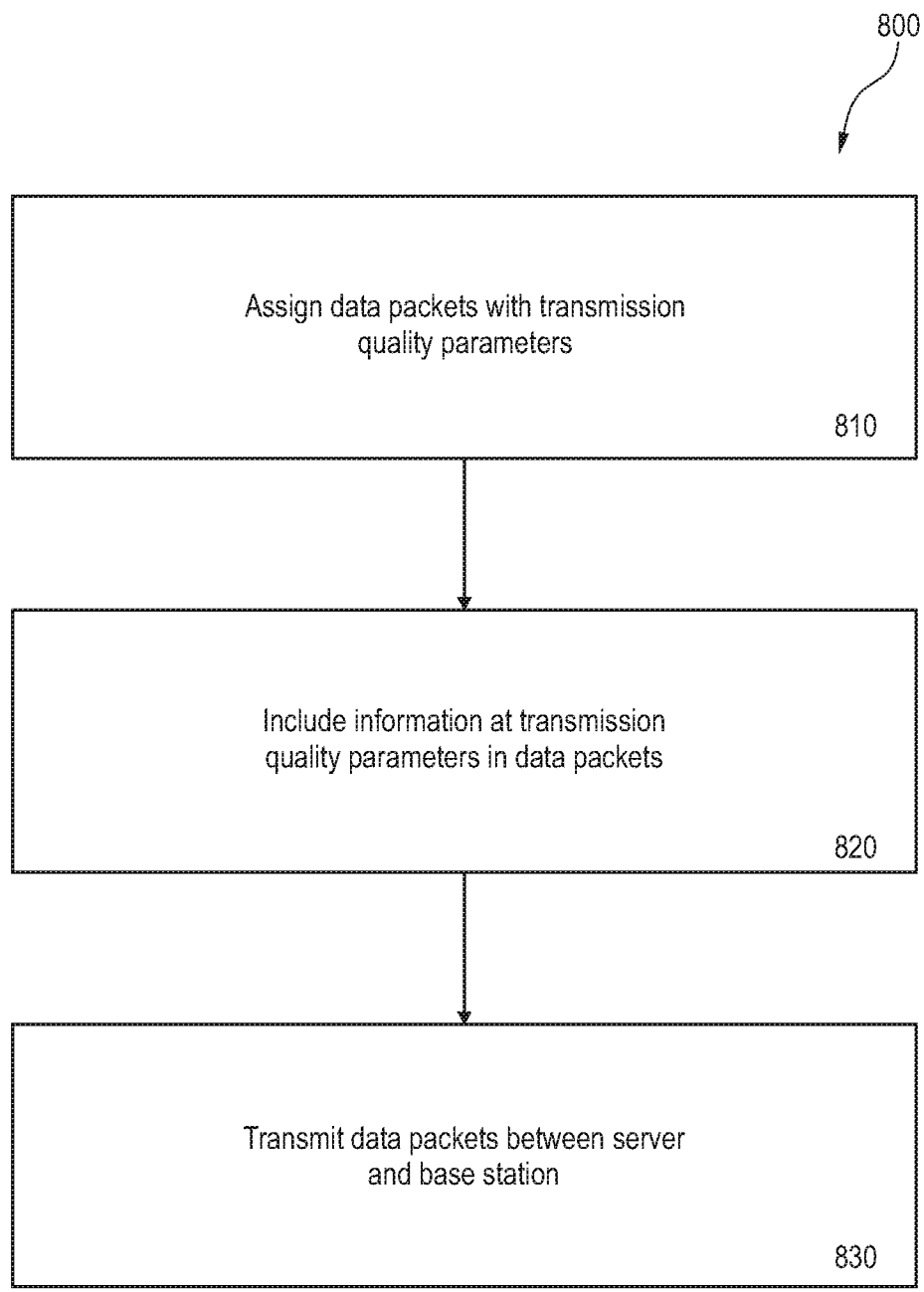
FIG. 8 shows a flowchart of a further method for improving the transmission of data.

Whilst methods 600 and 700 described with reference to FIGS. 6 and 7, respectively, improve the use of resources used for the DRB 40, further improvements may be achieved when communicating the data packets between the service provision server 110 providing the data service and the base station 20. Such a method 800 is shown as a flowchart in FIG. 8.

At step 810, each data packet is assigned with a set of transmission quality parameters. The base station 20 or the UPF (a server) 30 or another part of the core network may carry out this assignment or this may be determined in another way. The assignment of transmission quality parameters may be explicit. For example, this may be achieved by providing a set of transmission quality parameters with each data packet, e.g., as part of a header, or defining a predetermined set of parameters out of a plurality of sets of parameters. Alternatively, the data packets may be assigned with or as a data packet type, where each type has an associated set of transmission quality parameters. The information may be examined before a new QoS flow is established and set it up with more appropriate transmission quality parameters. Therefore, the QoS flow can be established and its resources allocated more appropriately according to uplink requirements from the UE 10 (e.g., for live video streaming).

The information defining the transmission quality parameters are included within the data packets. This information may also be implicit and indicated by the nature or properties of the data packets (e.g., size, content, etc.) In an example implementation, the information is included within a part of a GTP-U header of the data packet. At step 830 the data packets are transmitted between the server (e.g., UPF 30 that receives the data from server 110) and the base station 20.

The following describes the implementation of these methods and systems in more detail.

Figure 9:
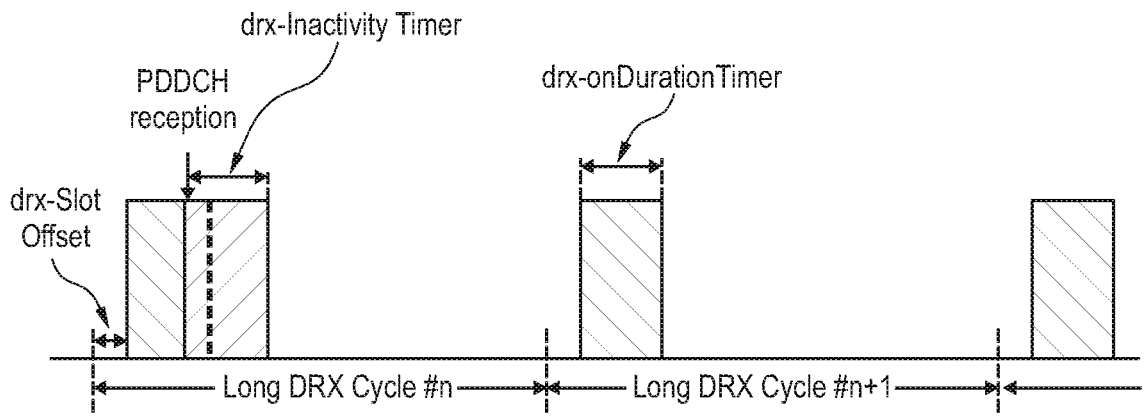
FIG. 9 shows a schematic diagram of the timing of messages with a UE in a telecommunications system.

In current telecommunication systems, UEs 10 are not necessarily listening to data channels all of the time but only during certain periods. This is illustrated schematically in FIG. 9. This figure illustrates at a high level how the UE 10 wakes up during a drx-on-duration timer and go to sleep after this time. When the UE 10 is scheduled with data during the time that it was active, then it would stay awake for an additional period (drx-inactive).

Figure 10:
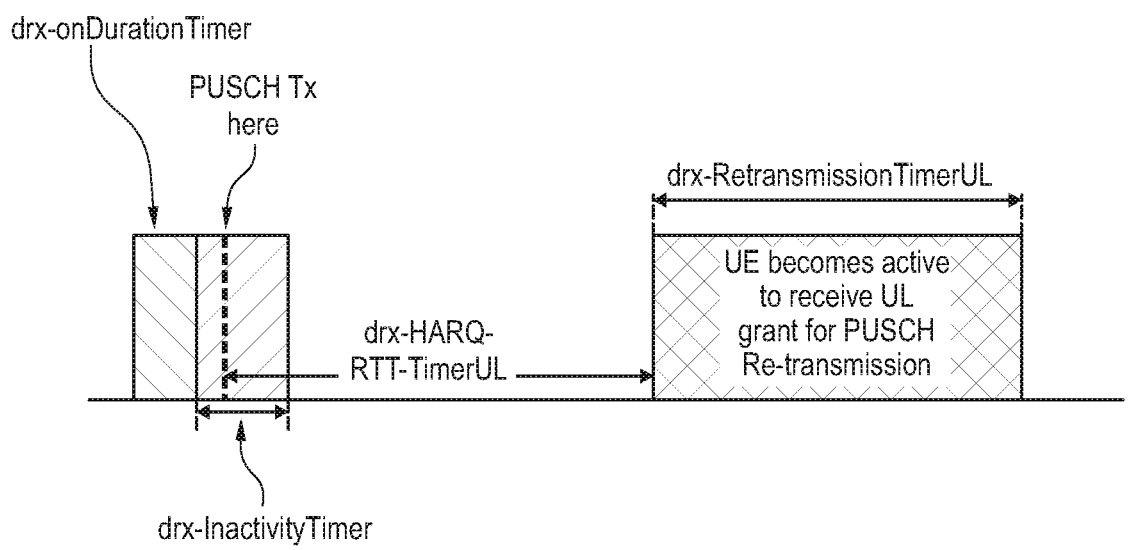
FIG. 10 shows a schematic diagram of the timing of messages with a UE in a telecommunications system.

FIG. 10 illustrates schematically the process of the UE 10 sending data. As can be seen in FIG. 10, the timer drx-HARQ-RTT-TimerUL defines the period that the UE 10 can expect a grant for uplink re-transmission. A further timer, drx-RetransmissionTimerUL, specifies a maximum number of slots for which the UE 10 should be monitoring PDCCH when a grant for uplink re-transmission is expected by the UE 10. Therefore, the gNB is able to send different parameters per stream to the UE 10. For example, the UE 10 may wait for retransmissions from the gNB 20 for a greater time for one data stream than for another.

Depending on the particular traffic characteristics, the DRX-RetransmissionTimerUL might be configured with different values or time periods and this needs to be provided to the UE 10. There may be multiple DRX-RetransmissionTimerUL values that are provided to the UE 10. In some examples, DRX-RetransmissionTimerUL_low and DRX-RetransmissionTimerUL_high may need to be defined to differentiate between low and high priority packets, which also require acknowledgment. For example, DRX configuration inside a RRCReconfiguration message may be used or any other RRC message where DRX-Configuration is present. An example current DRX-Configuration is shown in FIG. 11 (taken from 3GPP TS 38.331 V17.0.0 (2022-03)).

Providing information to the gNB 20 regarding a transmission quality parameter such as the priority of a data packet (e.g., high or low priority), is important as this enables the dNB 20 to be able to differentiate between DRX-RetransmissionTimerUL_Low and DRX-RetransmissionTimerUL_high data packets. Furthermore, this allows the gNB 20 to know how long the UE 20 will be waiting to receive an "ack" message. It is one enhancement to the current system that the UE 10 provides this information to the gNB 20.

In one example implementation of this enhancement, the MAC-PDU header, which normally consists of several subheaders, may be used. As it can be seen from the table 2, which shows the structure and values of LCID for UL-SCH, there is a reserved bit in the MAC header. According to this enhancement, this reserved bit may be used to indicate the importance of the data packet or other transmission quality parameter or set of parameters. Therefore, the UE 10 is able to differentiate streams with different characteristics and able to send packets to the gNB 20 identifying different streams using the MAC header.

Figure 12:
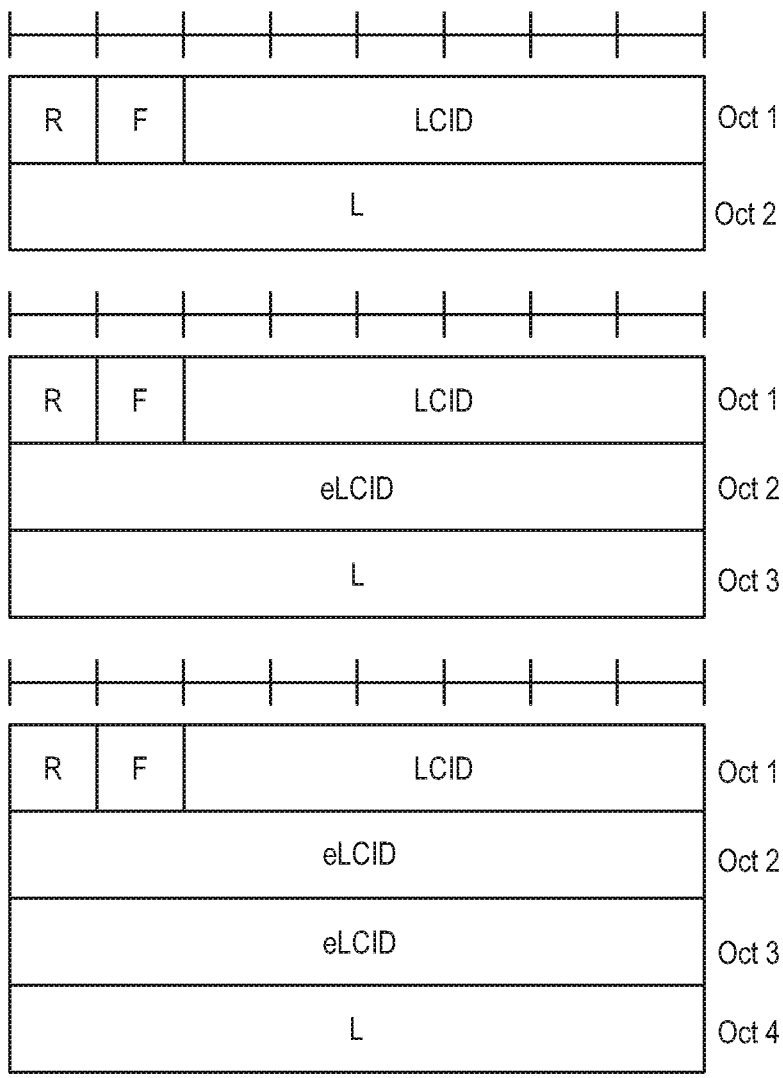
FIG. 12 shows an example information data header used to configure a telecommunications system.

If finer grained information about the importance of data packets is required, i.e. a need to provide more information than low and high importance data packets, then this also requires more than two different DRX retransmissionTimerUL timers. This requires more than one bit to indicate the priority of the packet or other transmission quality parameter. Therefore, in another example implementation of this enhancement, other reserved bits may be used, for example, the reserved bits from LCID (or eLCID), as illustrated schematically in FIG. 12.

Table 6.2 1-2 Values of LCID for UL-SCH

TABLE 2

| Codepoint/Index | LCID values |
|---|---|
| 0 | CCCH of size 64 bits (referred to as "CCCH1" in TS 38.331 [5]), except for a RedCap UE |
| 1-32 | Identity of the logical channel of DCCH and DTCH |
| 33 | Extended logical channel ID field (two-octet eLCID field) |
| 34 | Extended logical channel ID field (one-octet eLCID field) |
| 35 | CCCH of size 48 bits (referred to as "CCCH" in TS 38.331 [5]) for a RedCap UE |
| 36 | CCCH1 of size 64 bits (referred to as "CCCH1" in TS 38.331 [5]) for a RedCap UE |
| 37-43 | Reserved |
| 44 | Timing Advance Report |
| 45 | Truncated Sidelink BSR |
| 46 | Sidelink BSR |
| 47 | Reserved |
| 48 | LBT failure (four octets) |
| 49 | LBT failure (one octets) |
| 50 | BFR (one octet $C_i$) |

TABLE 2-continued

| Codepoint/Index | LCID values |
|---|---|
| 51 | Truncated BFR (one octet $C_i$) |
| 52 | CCCH of size 48 bits (referred to as "CCCH" in TS 38.331 [5]), except for a RedCap UE |
| 53 | Recommended bit rate query |
| 54 | Multiple Entry PHR (four octet $C_i$) |
| 55 | Configured Grant Confirmation |
| 56 | Multiple Entry PHR (one octet $C_i$) |
| 57 | Single entry PHR |
| 58 | C-RNTI |
| 59 | Short Truncated BSR |
| 60 | Long Truncated BSR |
| 61 | Short BSR |
| 62 | Long BSR |
| 63 | Padding |

The DRX-RetransmissionTimerUL is not the only parameter which that has been enhanced. A different number of retransmissions can be indicated and used for different priority data packets. This number of retransmissions may also depend on the required reliability for a given data stream inside one DRB 40. Therefore, data packets that are more important may use a higher number of repetitions (i.e., anther transmission quality parameter) compared with other, lower priority data packets or streams. These show example transmission quality parameters and how they may be communicated to different components within the system.

These are examples of a method for use within a wireless digital telecommunication system including a base station and a terminal or UE 10, wherein the base station 20 provides the UE 10 with a set of parameters to be used within the same data radio bearer depending on the priority of the packets and wherein the priority of the packets is indicated to the gNB 20.

Physical Uplink Shared Channel (PUSCH) Resources are transmitted with particular periodicities in telecommunications systems (e.g., 5G). The following enhancement describes how these periodicities can be varied within different components and how this information can be received when the periodicities are varied. This involves the use of a table or bitmap of the periodicity, which is communicated between components or nodes in the system.

The bitmap of periodicities is provided to the UE 10 for combined use of Uplink resources. This enables a further enhancement by enabling the scheduling of the UE 10 to be carried out in a more optimised way. This improves efficiencies as different data packets can be treated differently rather than transmitting them according to the highest requirements through a DRB 40. This can be especially useful if the data packets have different round trip timing (RTT) requirements, for example.

A table or bitmap with this periodicity mapping is provided to the UE or UEs 10. In the example illustrated in tables 3 to 5, there are two different data services with different periodicity requirements. As described previously, the two separate data services can set up two separate DRBs (DRB1 and DRB2 set up according to the separate requirements of table 3) having different transmission quality parameters (in this example, 100 ms and 150 ms periodicities), in a similar way to that shown in FIG. 4.

TABLE 3

| DRB1 | 100 ms | 100 ms | 100 ms | 100 ms | 100 ms |
|---|---|---|---|---|---|
| DRB2 | 150 ms | 150 ms | 150 ms | 150 ms | 150 ms |

Alternatively, the data packets from the two different data services may be multiplexed (e.g., using time division multiplexing) within the same DRB 40, as in a similar way to that shown in FIG. 5, i.e., multiplexed into a single DRB 40. In existing telecommunications networks, this requires a DRB 40 to be set up according to the requirements shown in table 4, i.e., with the lowest latency multiplexing being used for all data packets (100 ms in this example).

TABLE 4

| DRB1 Stream 1 | 100 ms | 100 ms | 100 ms | 100 ms | 100 ms |
|---|---|---|---|---|---|
| DRB1 Stream 2 | 150 ms | 150 ms | 150 ms | 150 ms | 150 ms |
| Multiplex DRB | 100 ms | 100 ms | 100 ms | 100 ms | 100 ms |

However, when a mapping of the periodicities of the different data packet types can be sent to the UE 10 then variable periodicities can be used, specific to each data packet or data packet type.

TABLE 5

| Stream 1 | 100 ms/X | 100 ms/X | 100 ms/X | 100 ms/X | 100 ms/X |
|---|---|---|---|---|---|
| Stream 2 | 150 ms/Y | 150 ms/Y | 100 ms/Y | 150 ms/Y | 150 ms/Y |
| Table of new transmission provided to the UE | 100 ms/x + y | 100 ms/x | 100 ms/x + y | 100 ms/x | 100 ms/x + y |

X and Y are data packets belonging to stream 1 and stream 2, respectively. The gNB 20 provides a "configured grant" configuration with a periodicity that the data may be sent in Uplink (UL) and also a configuration describing the periodicities of each data stream. The UE 10 may then transmit data belonging to Stream 1 or Stream 2 or alternatively, as a bit of one stream and a bit of the other stream. More than two streams may be used in a similar way. Whatever transmission scheme is used, the information used define such a scheme is encoded within a bitmap or schema (e.g., a table such as table 5). Such a table or bitmap may be devised based on properties of the data, available buffers and/or particular QoS requirements. In another example implementation, the separate data streams may relate to the I and P frames of a video stream. I-frames need to be transmitted less frequently that P-frames but require more system resources as they are less compressed. In this example, there is one data service being provided (e.g., live stream video) but two (or more types) of data packets are used and transmitted at different periodicities through the same DRB 40.

Information is provided to the UE 10 so that it can determine which data belongs to which stream. The way in which this information is provided may depend on the data within the stream. However, this information may be provided by using upper layer protocols such as GTP-U, TCP, UDP or others.

The above-described implementations describe enhancements to the UL and downlink (DL), including providing the UE 10 with a visibility of data traffic patterns. Similar and additional improvements are available for the Downlink (DL), requiring the base station (e.g., gNB) 20 to have visibility of the incoming packets. Some of the examples of traffic pattern characteristics include but are not limited to: the periodicity of the data, the amount of data in a particular time interval, packet value, and acceptable jitter.

This may be achieved using new QoS/5QI values and GTP-U packet marking, for example. The Access and Mobility Management Function (AMF) may include new characteristics for use when a new QoS Flow is established. These new characteristics may include but are not limited to: the periodicity of the data stream, the size of the data packet, relative importance of the data traffic, etc. This is illustrated schematically as the packet flow shown in FIG. 13. This figure illustrates data packets being sent having different sizes and with different priorities, through the DRB 40. New attributes may be included as new QoS values or as separate priorities. This is illustrated schematically in FIG. 14.

FIG. 14 illustrates an example of inclusion of new traffic characteristics and indication of new characteristics using newly a defined QoS Class Index (QCI). QCI indicates QoS attributes of the traffic including the legacy QoS attributes (BLER and priority) and the newly added QoS attributes of traffic arrival pattern. The traffic arrival pattern in this example is that the first packet arrives at T1 and the second packet arrives at T1+100 ms, the third packet arrives at T1+100+50 ms and the fourth packet arrives at T1+100+50+50 ms. The packet arrival pattern repeats. As such the fifth packet arrives at T1+100+50+50+100 ms and so on. The corresponding QCI value is communicated to the network nodes at the bearer setup, e.g., using information included within the data packets. This information may be included as GTP-U packet marking, for example. Different combinations of packet arrival patterns and different repeating lengths and timings may be used. Moreover, bearers can be setup using the legacy bearer setup procedure, e.g., using control plane signalling for bearer setup.

FIG. 14 also illustrates the newly added QoS attributes of traffic arrival as a separately added QoS attribute. QCI values refers to the legacy QoS attributes such as BLER and priority, while the traffic arrival pattern is provided together with the QCI value. In this example traffic arrival pattern is provided as an array [100 ms, 50 ms, 50 ms]. This has the same interpretation as above such that the first packet arrives at T1 and the second packet arrives at T1+100 ms, the third packet arrives at T1+100+50 ms and the fourth packet arrives at T1+100+50+50 ms. The packet arrival pattern repeats. As such the fifth packet arrives at T1+100+50+50+100 ms and so on. the corresponding QCI value and the traffic arrival pattern is communicated to the corresponding network nodes at the bearer setup.

The base station (e.g., gNB) 20 receives such parameters and sets up DRB(s) 40 accordingly. User Plane data packets may be recognised at the gNB level in DL based on any information inside the headers of transport protocols (e.g., GTP-U, UDP, TCP, RTP, etc.).

As will be appreciated by the skilled person, details of the above embodiment may be varied without departing from the scope of the present invention, as defined by the appended claims.

For example, the example systems are shown as having a single UE but many UEs may be included and serviced by the described systems and methods. Furthermore, a plurality of base stations (e.g., gNBs) may be added to the system and include the described enhanced functionality. Various components within the systems may implement the described methods, including the UEs, the base stations, the servers and/or dedicated servers (e.g., virtual, dynamic, or static servers). Other multiplexing types may be used and this is not limited to time division multiplexing Many combinations, modifications, or alterations to the features of the above embodiments will be readily apparent to the skilled person and are intended to form part of the invention. Any of the features described specifically relating to one embodiment or example may be used in any other embodiment by making the appropriate changes.

The invention claimed is:

1. A method for communicating data with user equipment, UE, the method comprising the steps of:
    establishing a data radio bearer, DRB, between a base station and the UE; and
    transmitting data packets between the base station and the UE through the DRB,
    wherein data packets are transmitted by multiplexing data packets for different data packet types at different periodicities in a time division multiplexed data stream, and
    wherein the DRB provides means to handle data packet types having different periodicities.

2. The method of claim 1, further comprising the step of the base station providing the UE with information mapping the periodicities of the different data packet types in the time division multiplexed data stream.

3. The method of claim 2, wherein the information mapping the periodicities of the separate data services in the multiplexed data stream are provided as a table.

4. The method of claim 2, wherein the information mapping the periodicities of the different data packet types is provided to the UE within radio resource control, RRC, protocol during configuration of the DRB.

5. The method of claim 4, wherein the information mapping the periodicities of the different data packet types is provided to the UE within radio resource control, RRC, protocol during configuration of the DRB within configured grant configuration.

6. The method of claim 1, wherein the data packets between the base station and the UE are uplink data packets.

7. The method of claim 6, wherein the uplink data packets are transmitted on a physical uplink shared channel, PUSCH.

8. The method of claim 1, wherein separate data services have different round trip timing, RTT requirements.

9. The method of claim 1, wherein separate data services have different periodicity requirements.

10. The method of claim 1, wherein the different data packet types include I and P frames.

11. A telecommunications system comprising:
    one or more base stations; and
    a User Equipment, UE, comprising:
        a processor; and
        non-transitory computer readable storage medium having stored thereon executable instructions that when executed by the processor cause the UE to perform the following:
        establish a data radio bearer, DRB, between a base station and the UE; and
        transmit data packets between the base station and the UE through the DRB, wherein data packets are transmitted by multiplexing data packets for different data packet types at different periodicities in a time division multiplexed data stream, and wherein the DRB provides means to handle data packet types having different periodicities.

12. A User Equipment, UE, comprising:

a processor; and non-transitory computer readable storage medium having stored thereon executable instructions that when executed by the processor cause the UE to perform the following:

establish a data radio bearer, DRB, between a base station and the UE; and transmit data packets between the base station and the UE through the DRB, wherein data packets are transmitted by multiplexing data packets for different data packet types at different periodicities in a time division multiplexed data stream, and wherein the DRB provides means to handle data packet types having different periodicities.

13. The UE of claim 1, the UE is provided from a base station information mapping the periodicities of the different data packet types in the time division multiplexed data stream.

14. The UE of claim 13, wherein the information mapping the periodicities of the separate data services in the multiplexed data stream are provided as a table.

15. The UE of claim 13, wherein the information mapping the periodicities of the different data packet types is provided to the UE within radio resource control, RRC, protocol during configuration of the DRB.

16. The UE of claim 15, wherein the information mapping the periodicities of the different data packet types is provided to the UE within radio resource control, RRC, protocol during configuration of the DRB within configured grant configuration.

17. The UE of claim 12, wherein the data packets between the base station and the UE are uplink data packets.

18. The UE of claim 17, wherein the uplink data packets are transmitted on a physical uplink shared channel, PUSCH.

19. The UE of claim 12, wherein separate data services have different round trip timing, RTT requirements.

20. The UE of claim 12, wherein separate data services have different periodicity requirements.

* * * * *